No. 872,121. PATENTED NOV. 26, 1907.
W. A. GREENLAW.
FLEXIBLE PIPE JOINT.
APPLICATION FILED JULY 27, 1907.
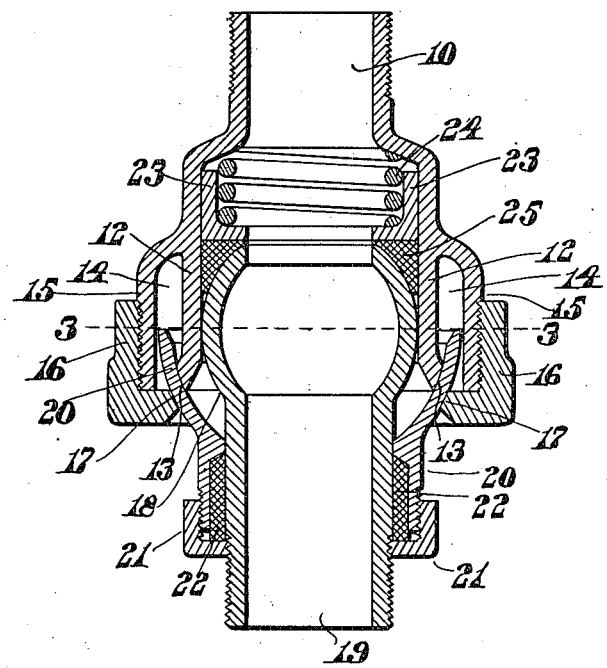
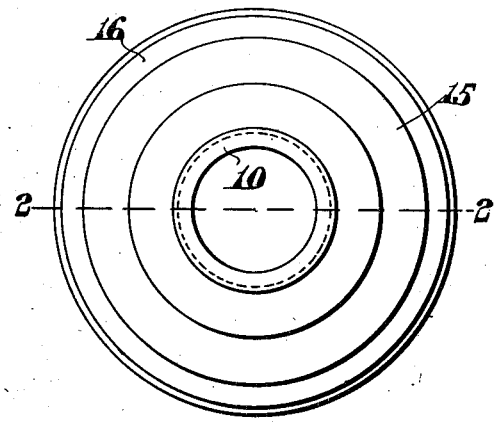
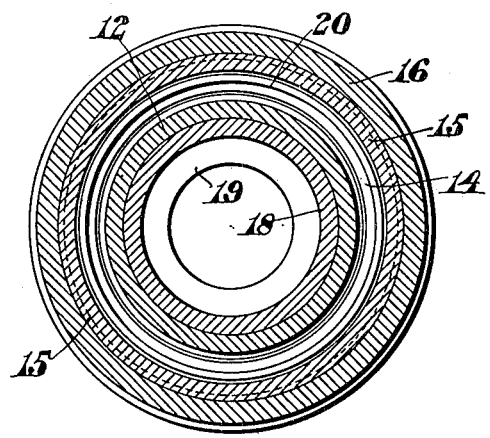
Witnesses:
Howard Hanscom
Nathan C. Lombard
Inventor:
Warren A. Greenlaw,
by Walter E. Lombard,
Atty.

UNITED STATES PATENT OFFICE.

WARREN A. GREENLAW, OF MELROSE, MASSACHUSETTS, ASSIGNOR TO THE GREENLAW MANUFACTURING CO., OF BOSTON, MASSACHUSETTS, A CORPORATION OF MAINE.

FLEXIBLE PIPE-JOINT.

No. 872,121.　　　　Specification of Letters Patent.　　　Patented Nov. 26, 1907.

Application filed July 27, 1907. Serial No. 385,832.

*To all whom it may concern:*

Be it known that I, WARREN A. GREENLAW, a citizen of the United States of America, and a resident of Melrose, in the county of Middlesex and State of Massachusetts, have invented certain new and useful Improvements in Flexible Pipe-Joints, of which the following is a specification.

This invention relates to flexible pipe joints and has for its objects the production of a joint in which the pipe members may be moved to any desired angle and at the same time maintain a tight joint between the two pipe members to prevent leakage while provision is also made to reduce the friction between the two, owing to pressure thereon, to a minimum.

The invention consists in certain novel features in construction and arrangement of parts which will be fully understood by reference to the description of the drawings and to the claims hereinafter given.

Of the drawings, Figure 1 represents a plan of a joint embodying the features of this invention. Fig. 2 represents a vertical section of the same, the cutting plane being on line 2, 2, on Fig. 1, and Fig. 3 represents a horizontal section on line 3, 3, on Fig. 2.

In the drawings, 10 is a pipe member provided at one end with an enlarged axial chamber 11, the cylindrical walls 12 of which terminate in a semi-spherical seat 13. Surrounding the chamber 11 and outside the walls 12 is an annular chamber 14 formed by the apron 15 depending from the pipe member 10. Threaded to the apron 15 is a cap 16 having a semi-spherical seat 17 concentric to the seat 13. Within the chamber 11 is fitted the ball shaped end 18 of the pipe member 19 which has mounted thereon the semi-spherical member 20 adapted to fit between the seats 13 and 17, thus forming a double seal to prevent the leakage of steam or other substance passing through the pipe members.

The member 20 is loosely mounted upon the pipe member 19 and has threaded thereto the cap 21 which retains in place the packing 22 which prevents leakage between the two, the cap 21 being also threaded to the pipe member 18 to retain the member 20 in position. Between the inner end of the ball end 18 is mounted an annular follower 23 which is acted upon by the spring 24 to force the member 20 to its seat.

A packing 25 is interposed between the follower 23 and the ball end 18 to prevent leakage between said ball end 18 and the wall 12.

By making the seating portion of the member 20 of a diameter relatively greater than the area acted upon by the pressure of the material passing through the pipe members, the friction on the seating surfaces is reduced to a minimum.

By the construction shown in the drawings and herein described, a perfectly tight joint is provided having a plurality of seals which must be overcome before leakage can occur.

It is believed that the many advantages of the joint and its operation is so apparent from the foregoing as to need no further description.

Having thus described my invention, I claim:

1. In a flexible pipe joint, the combination of a pipe member provided with an enlarged chamber the walls of which terminate in a semi-spherical seat; another pipe member provided with a ball shaped end fitting said chamber; a semi-spherical member on the latter pipe member fitting said seat; and means for forcing said member to its seat.

2. In a flexible pipe joint, the combination of a pipe member provided with an enlarged chamber the walls of which terminate in a semi-spherical seat; another pipe member provided with a ball shaped end fitting said chamber; a semi-spherical member on the latter pipe member fitting said seat; an annular follower for said ball shaped end; a packing between the two; and a spring adapted to act upon said follower to force the semi-spherical member to its seat.

3. In a flexible pipe joint, the combination of a pipe member having an enlarged axial chamber, the walls of which terminate in a semi-spherical seat; an annular apron extending from said pipe member and forming an annular chamber surrounding said axial chamber; a cap secured to said apron provided with a semi-spherical seat concentric to the other seat; a pipe member provided with a ball shaped end fitting said enlarged axial chamber; means for packing the same therein; and a semi-spherical member on said ball ended pipe member adapted to fit between said seats.

4. In a flexible pipe joint, the combination of a pipe member having an enlarged axial chamber, the walls of which terminate in a semi-spherical seat; an annular apron extending from said pipe member and forming an annular chamber surrounding said axial chamber; a cap secured to said apron provided with a semi-spherical seat concentric to the other seat; a pipe member provided with a ball shaped end fitting said enlarged axial chamber; means for packing the same therein; a semi-spherical member on said ball ended pipe member adapted to fit between said seats; and means for adjusting one semi-spherical seat relative the other.

5. In a flexible pipe joint, the combination of a pipe member having an enlarged axial chamber, the walls of which terminate in a semi-spherical seat; an annular apron extending from said pipe member and forming an annular chamber surrounding said axial chamber; a cap secured to said apron provided with a semi-spherical seat concentric to the other seat; a pipe member provided with a ball shaped end fitting said enlarged axial chamber; means for packing the same therein; a semi-spherical member on said ball ended pipe member adapted to fit between said seats; and means for packing the joint between said semi-spherical member and said pipe member.

6. In a flexible pipe joint, the combination of a pipe member having an enlarged central chamber; another pipe member provided with a ball end fitting said chamber; an annular semi-spherical seating surface on one of said pipe members; a semi-spherical member on the other pipe member concentric with said ball end and of relatively greater diameter; and means for retaining said member on its seat.

Signed by me at Boston, Mass., this 25th day of July, 1907.

WARREN A. GREENLAW.

Witnesses:
 WALTER E. LOMBARD,
 NATHAN C. LOMBARD.